(12) United States Patent
Mühlenbein et al.

(10) Patent No.: US 8,000,070 B2
(45) Date of Patent: Aug. 16, 2011

(54) MOTOR CONTROL CIRCUIT WITH MALFUNCTION MONITORING

(75) Inventors: Rudolf Mühlenbein, Graftschaft (DE); Andreas Nestler, Elmenhorst/Lichtenhagen (DE)

(73) Assignee: Lucas Automotive GmbH (DE)

( * ) Notice: Subject to any disclaimer, the term of this patent is extended or adjusted under 35 U.S.C. 154(b) by 392 days.

(21) Appl. No.: 12/086,794

(22) PCT Filed: Dec. 18, 2006

(86) PCT No.: PCT/EP2006/012203
§ 371 (c)(1),
(2), (4) Date: Oct. 9, 2008

(87) PCT Pub. No.: WO2007/079924
PCT Pub. Date: Jul. 19, 2007

(65) Prior Publication Data
US 2009/0219659 A1      Sep. 3, 2009

(30) Foreign Application Priority Data

Dec. 21, 2005   (DE) .................. 10 2005 061 215

(51) Int. Cl.
    *H02H 3/00*        (2006.01)
(52) U.S. Cl. ................................................ 361/84
(58) Field of Classification Search .............. 361/84;
                                            388/811; 257/300
    See application file for complete search history.

(56) References Cited

U.S. PATENT DOCUMENTS

| 6,512,346 | B2 * | 1/2003 | Yoshimura | 318/599 |
| 6,577,482 | B1 * | 6/2003 | Eisenhardt et al. | 361/84 |
| 6,683,777 | B2 * | 1/2004 | Shimoida et al. | 361/152 |
| 6,747,732 | B1 * | 6/2004 | Lee | 355/75 |

FOREIGN PATENT DOCUMENTS

| DE | 199 41 489 A1 | 3/2001 |
| DE | 101 18 401 A1 | 11/2001 |
| DE | 100 50 287 A1 | 5/2002 |

* cited by examiner

*Primary Examiner* — Jared J Fureman
*Assistant Examiner* — Angela Brooks
(74) *Attorney, Agent, or Firm* — MacMillian, Sobanski & Todd, LLC

(57) ABSTRACT

The invention relates to a control circuit which serves for security-critical control of a consumer with an inductive load portion, to be connected to a direct voltage source, and a method for failure control. It is in this case assumed that the control circuit has a power driving assembly, a free-wheeling assembly and a reverse-connection protected assembly. In order to increase the probability of failure recognition, this control circuit is extended by a method for failure control. For this purpose the semiconductor switches of the assemblies, each formed by a MOSFET, are individually driven. The different switching statuses are checked by a diagnostic device which processes voltage values to be read out at outputs of the control circuit. In this way failure-free functionality and also possible causes of failure in the control circuit can be diagnosed.

17 Claims, 4 Drawing Sheets

Matrix:

| | Normal operating status | Reversed polarity operating status | Test case 1 operating status | Test case 2 operating status | Test case 3 operating status |
|---|---|---|---|---|---|
| MOSFET 8 | X | X | Off | Off | Off |
| MOSFET 10 | Off | X | Off | On | Off |
| MOSFET 12 | On | Off | Off | Off | On |
| $U_{Motor\_FBK}$ | 0 | $-(U_{Bat}-V_{F\_Q1})$ | $U_{Bat}$ | 0 | 0 |
| $U_{Diode\_FBK}$ | $U_{Bat}$ | $-(U_{Bat}-V_{F\_Q1}-V_{F\_Q3})$ | 0 | $V_{F\_Q2}$ | $U_{Bat}$ |
| | | | $V_{F\_Q3}$ | | $V_{F\_Q3}$ |

| MOSFET 10: $R_{DS} \to 0$ | MOSFET 10: $R_{DS} \to \infty$ |
|---|---|
| MOSFET 12: $R_{DS} \to 0$ | MOSFET 12: $R_{DS} \to \infty$ |
| OK | consumer disconnected |

Legend:

On = MOSFET switched on (conductive operation); Off = MOSFET switched off (blocking operation); X = either
$U_{Bat}$ = feed voltage
$V_{F\_Q1}, V_{F\_Q2}, V_{F\_Q3}$ = conducting state voltages of the intrinsic diodes 60, 64, 62
$R_{DS}$ = resistance between drain and source of a MOSFET

Fig. 4

MOTOR CONTROL CIRCUIT WITH MALFUNCTION MONITORING

CROSS-REFERENCE TO RELATED APPLICATIONS

This application is the National Stage of International Application No. PCT/EP2006/012203 filed Dec. 18, 2006, the disclosures of which are incorporated herein by reference in their entirety, and which claimed priority to German Patent Application No. 10 2005 061 215.6 filed Dec. 21, 2005, the disclosures of which are incorporated herein by reference in their entirety.

BACKGROUND OF THE INVENTION

The invention relates to a control circuit which serves for security-critical driving of an electric consumer with an inductive load portion (e.g. direct current motor) to be connected to a direct voltage source.

Direct current motors are often controlled today with the aid of a power driving assembly integrated in the control circuit. The power driving assembly disconnects or connects the direct current motor electrically from/to the direct voltage source. A circuit construction suitable for this and known from the applicant's operational practice provides switching the power driving assembly as connecting link between a feed voltage source and the direct current motor. FIG. 1 illustrates an arrangement of the power driving assembly of this kind.

Citation (1) (DE 100 50 287) describes a protective device for the drive for unipolar direct current motors, which enables compact design of the drive circuit components and prevents thermal overload of the components.

A direct current drive device is known from citation (2) (DE 101 18 401, and corresponding U.S. Pat. No. 6,512,346 B2, both of which are incorporated by reference herein). The direct current drive device has a switching device on a first current path between a direct current supply and a direct current motor and a detection device which detects a voltage on a second current path between the direct current motor and the switching device.

The switching device has various switching elements and the detection device has various detection devices. Each switching element is provided on the first current path. Each detection element detects the voltage on the second current path. Each of the first current paths contains one of the second current paths in each case. An assessment device judges that there is a failure on a third current path from the direct current supply to the switching devices via the direct current motors if one of the voltages of the detection device does not change.

The control circuit 2 illustrated in FIG. 1 has, apart from the power driving assembly 4, a free-wheeling diode 6. The power driving assembly 4 has a power MOSFET (8) with three terminals (drain 14, source 16, gate 18). The drain terminal 14 is connected to the feed voltage source 20. A control assembly 22 serves to drive the MOSFET 8. It contains a charge pump (24), which delivers the gate voltage (18) of the MOSFET 8, and a microcontroller 26 to drive the MOSFET 8. The control assembly 22 is connected to the gate terminal 18 of the MOSFET 8 and via two further terminals returned to differently designed earths (GND_P 28 and GND 30). An ohmic resistor 66 is switched parallel to the gate source path of MOSFET 8 of the power driving assembly 4. The series circuit consisting of two breakdown diodes 68, 70 is likewise switched parallel to the gate source path of MOSFET 8 of the power driving assembly. Since the anodes of the breakdown diodes 68, 70 are switched together, their effect is comparable to that of an electric resistor or a bi-directionally operating limiting diode. The MOSFET 8 serves as semiconductor switch, the respective switching status of which is fixed by the microcontroller 26. When the direct current motor 32 is electrically disconnected from the feed voltage source 20 by the power driving assembly 4, the inductive load portion of the direct current motor 32 generates an undesired voltage peak, among other things, on the basis of self-induction. The energy stored in the motor inductance and also energy from the feed voltage source 20 are in this case reduced via MOSFET 8 of the power driving assembly 4. To protect MOSFET 8 of the power driving assembly 4 a power diode, acting as free-wheeling diode 6, is switched parallel to the direct current motor 32. This is switched in the blocking direction in respect of the feed voltage source 20 and has the task of reducing the voltage peak occurring when the feed voltage source 20 is electrically separated from the direct current motor 32. The parallel switching consisting of direct current motor 32 and free-wheeling diode 6 is connected to the source terminal 16 of MOSFET 8. The second terminal of this parallel circuit is returned to earth 28.

A further development of the control circuit 2 illustrated in FIG. 1 provides for expanding the control circuit 2 by a reverse-connection protected MOSFET 12. At the same time the free-wheeling diode 6 from FIG. 1 is replaced by a free-wheeling MOSFET 10, the intrinsic diode 62 of which acts as a free-wheeling diode in blocking operation of the free-wheeling MOSFET 10. The resulting control circuit 34 with power driving assembly 4, free-wheeling MOSFET 10 and reverse-connection protected MOSFET 12 is illustrated in FIG. 2, as known from DE 10050287 A1.

The control circuit 34 illustrated in FIG. 2 has a power driving assembly 4 equivalent to the control circuit 2 in FIG. 1. The drain terminal 14 of MOSFET 8 of the power driving assembly 4 is connected to the feed voltage source 20. Driving of MOSFET 8 is done via the gate terminal 18 by a PCU 36 power control unit. A further terminal of the PCU 36 is returned to earth 28. The source terminal 16 of MOSFET 8 is connected to the direct current motor 32, a zero-point comparator 38 and the drain terminal 14 of the free-wheeling MOSFET 10. The direct current motor 32 and the zero-point comparator 38 are returned to earth 28 with a second terminal. To drive the free-wheeling MOSFET 1.0 its gate terminal 18 is connected to the zero-point comparator 38. The source terminal 16 of the free-wheeling MOSFET 10 and that of the reverse-connection protected MOSFET 12 form a direct connection. Drain 14 of the reverse-connection protected MOSFET 12 is returned to earth 28. To drive the reverse-connection protected MOSFET 12 its gate terminal 18 is connected to the feed voltage source 20 via an ohmic resistor 84. The zero-point comparator 38 is likewise connected to the feed voltage source 20. MOSFETS 8, 10, 12 of the control circuit 34 have in each case a series circuit, switched parallel to the gate source path, consisting of two breakdown diodes. Since the anodes of the two breakdown diodes of each of the three pairs of breakdown diodes 72, 74; 76, 78 and 80, 82 are switched together, the effect of each pair of breakdown diodes is comparable to that of an electric resistor or a bi-directionally operating limiting diode. MOSFETS 8, 10, 12 of the control circuit 34 further behave in blocking operation like a diode switched parallel to the MOSFET (intrinsic diode), the cathode of which is led through at the drain terminal 14 and the anode of which is led through at the source-terminal 16 of the MOSFET.

The mode of operation of the control circuit 34 illustrated in FIG. 2 is examined below. MOSFET 8 of the power driving assembly 4 here acts as semi-conductor switch. Controlled by a PCU 36, it connects the direct current motor 32 to the feed voltage source 20.

Functioning of the free-wheeling MOSFET 10 is controlled in the switched-off phases by the zero-point comparator 38. This identifies an electrical disconnection between the feed voltage source 20 and the direct current motor 32 with the aid of the negative potential at the source terminal 16 of MOSFET 8 of the power driving assembly 4. As a result of this the zero-point comparator 38 feeds the free-wheeling MOSFET 10 with a gate voltage. The free-wheeling MOSFET 10 now remains switched on during the entire switching off process. Compared with the free-wheeling diode 6 in FIG. 1, a smaller drop in voltage occurs via the switched-on free-wheeling MOSFET 10. Besides the reduction in losses in the free-wheeling MOSFET 10, at the same time a tail current in MOSFET 8 of the power driving assembly 4 during the switching off process is avoided. At the end of the switching off process the potential at the source terminal 16 of MOSFET 8 of the power driving assembly 4 again approaches that of the earth 28. The zero-point comparator 38 identifies this status and reduces the gate potential of the free-wheeling MOSFET 10 until it is operating purely as a diode. This avoids an undesired braking effect of the direct current motor 32 because of a negative current influence.

The reverse-connection protected MOSFET 12 has the task of protecting the free-wheeling MOSFET 10 from overload in the event of reversed polarity. This is achieved by the blocking behaviour of the reverse-connection protected MOSFET 12, which causes disconnection of the free-wheeling MOSFET 10 from the voltage supply.

Driving of the power driving assembly by the PCU is frequently based on a specific clock rate. The power driving assembly here disconnects and connects the direct voltage source electrically from/to the control circuit within a clock period.

Reducing the losses during the switching process by using a free-wheeling diode or a free-wheeling MOSFET is of great significance at low-frequency clock rates. The presence and failure-free functional ability of a free-wheeling diode or a free-wheeling MOSFET are an important precondition for the operation of the control circuit in security-critical applications. These include, for example, the ABS (anti-lock brake system) or the FDR (driving dynamics regulation) in automobile technology. The above-described control circuits have no facility for failure control. As a result they have a high risk priority number (RPN) in a failure mode and effects analysis (FMEA).

The probability of failure occurring is currently dependent exclusively on the production options and the failures occurring in practical use. However, an improvement in the production options is often not possible on technological or economic grounds.

SUMMARY OF THE INVENTION

The object of the invention is to demonstrate a control circuit which serves for security-critical driving of an electric consumer with an inductive load portion (e.g. direct current motor) to be connected to a direct voltage source for use in security-critical applications and which has a reduced risk priority number in a failure mode and effects analysis. The invention additionally relates to a method for failure control in a control circuit of this kind. In order to identify malfunctions of the drive circuit in good time, a control circuit with additional failure control is proposed by the present invention.

To achieve the above object the control circuit has a control mechanism which serves for failure control. The failure control of the control circuit is set up in such a way that control signals are to be fed in at the inputs of the assemblies. Different operating statuses of the control circuit are to be set by the driving of the assemblies. Further provided are outputs at which voltage values are to be read out. Using these values, a diagnostic device determines the switching statuses of the assemblies.

This makes checking of the functionality of the assembly possible. As well as ascertaining a failure-free mode of operation, defective functions of the control circuit are recognisable. Further, by comparing with reference values concrete reasons for recognised malfunctions can be identified.

By the introduction of the failure control two central aims can be achieved.
1. The use of failure control in the operating period of the control circuit leads to an improvement in the probability of failure recognition.
2. By the use of failure control, for example in a test run at the manufacturer's, the probability of failure occurrence can be reduced even before delivery of the control circuit to a customer.

The failure control of the control circuit serves for security-critical control of an electric consumer to be connected to a direct voltage source. The electric consumer may in this case be an electric motor to be operated with direct current (direct current motor).

In order to disconnect the feed voltage source electrically from the control circuit or to connect it thereto, the control circuit has a power driving assembly. This contains a driveable first semi-conductor switch. This is preferably a MOSFET, which by its conductive and blocking behaviour generates two switching statuses and is to be driven via its gate terminal. Control of the first semi-conductor switch can be done in this case with the aid of a microcontroller. The microcontroller here generates control signals which set the conductive and blocking behaviour of the first semi-conductor switch.

Furthermore, the control circuit has a free-wheeling assembly which has a free-wheeling diode for reducing the electric voltage peak, which arises because of the electric disconnection of the feed voltage source from the consumer by self-induction. Depending on the configuration of the free-wheeling assembly, the intrinsic diode of a MOSFET operates like a free-wheeling diode.

The free-wheeling assembly has a driveable second semi-conductor switch. This is a MOSFET, which by its conductive and blocking behaviour generates two switching statuses and is to be driven via its gate terminal. Control of the second semi-conductor switch can be done with the aid of a microcontroller. The microcontroller here generates control signals which set the conductive and blocking behaviour of the second semi-conductor switch.

Furthermore, the control circuit has a reverse-connection protected assembly which has a driveable third semi-conductor switch. This is preferably a MOSFET, which by its conductive and blocking behaviour generates two switching statuses and is to be driven via its gate terminal. Control of the third semi-conductor switch can be done with the aid of a microcontroller. The microcontroller here generates control signals which set the conductive and blocking behaviour of the third semi-conductor switch.

To guarantee the reverse-connection protection the third semi-conductor switch has an electric resistor which avoids a short circuit current between the poles of the feed voltage source when the feed voltage source is connected to the control circuit with reversed polarity.

The invention provides that the semi-conductor switch of at least one of the assemblies is to be driven with a control signal. The assembly to be driven in this case has at least one input at which the control signal is to be fed in.

At the same time the semi-conductor switch of the assembly to be driven is to be transferred by the drive into at least two switching statuses. Depending on the configuration of the assembly the semi-conductor switch may be transferred into at least two different switching statuses. At least one first and one second switching status of the respective semi-conductor switch are to be set by a control signal being fed in at the first input of the respective assembly.

In the first switching status to be set the semi-conductor switch is switched into blocking operation. In the second switching status to be set the semi-conductor switch is switched into conductive operation.

Furthermore, different operating statuses of the control circuit are to be set by driving the semi-conductor switch. In particular, at least two different operating statuses are to be set by driving at least one semi-conductor switch.

In a first operating status (normal operating status) of the control circuit the semi-conductor switch of the free-wheeling assembly has the first switching status (blocking operation) and the semi-conductor switch of the reverse-connection protected assembly the second switching status (conductive operation). At the same time, at least one first output of the control circuit an output signal is provided, which is to be supplied to a diagnostic device. The diagnostic device can recognise the switching statuses of the first operating status and deviations therefrom.

In a second operating status (reversed polarity operating status) of the control circuit the semi-conductor switch of the reverse-connection protected assembly has the first switching status (blocking operation). At the same time, at least one first output of the control circuit an output signal is provided which is to be supplied to a diagnostic device. The diagnostic device can recognise the switching statuses of the first operating status and deviations therefrom.

In a third operating status (test case 1 operating status) of the control circuit the semi-conductor switch of all the assemblies has the first switching status (blocking operation). At the same time, at least one first output of the control circuit an output signal is provided which is to be supplied to a diagnostic device. The diagnostic device can recognise the switching statuses of the third operating status and deviations therefrom.

In a fourth operating status (test case 2 operating status) of the control circuit the semi-conductor switch of the power driving assembly and the reverse-connection protected assembly has the first switching status (blocking operation) and the semi-conductor switch of the free-wheeling assembly the second switching status (conductive operation). At the same time, at least one first output of the control circuit an output signal is provided, which is to be supplied to a diagnostic device. The diagnostic device can recognise the switching statuses of the fourth operating status and deviations therefrom.

In a fifth operating status (test case 3 operating status) of the control circuit the semi-conductor switch of the power driving assembly and the free-wheeling assembly has the first switching status (blocking operation) and the semi-conductor switch of the reverse-connection protected assembly the second switching status (conductive operation). At the same time, at least one first output of the control circuit an output signal is provided, which is to be supplied to a diagnostic device. The diagnostic device can recognise the switching statuses of the fifth operating status and deviations therefrom.

According to the invention the inputs of the assemblies can be impinged with control signals in such a way that a demultiplexer is used for this internally. In this case, after a switching function the control signals from a serial signal sequence are supplied to the inputs. In this way different switching statuses can be generated sequentially after a switching function. The use of different switching sequences for automated failure control is in this way possible, wherein a control programme can be used.

Finally, the invention relates to a diagnostic device which performs a comparison between the output signal provided at the first output and reference values to determine failures in the control circuit. The comparisons are here performed by means of threshold value decisions.

Other advantages of this invention will become apparent to those skilled in the art from the following detailed description of the preferred embodiments, when read in light of the accompanying drawings.

BRIEF DESCRIPTION OF THE DRAWINGS

FIG. 4 shows a matrix in which the voltage values to be read out at two outputs of the control circuit are assigned to five different operating statuses of the control circuit. Each voltage value listed in the matrix is explained by the legend.

DETAILED DESCRIPTION OF THE INVENTION

Figure 2:
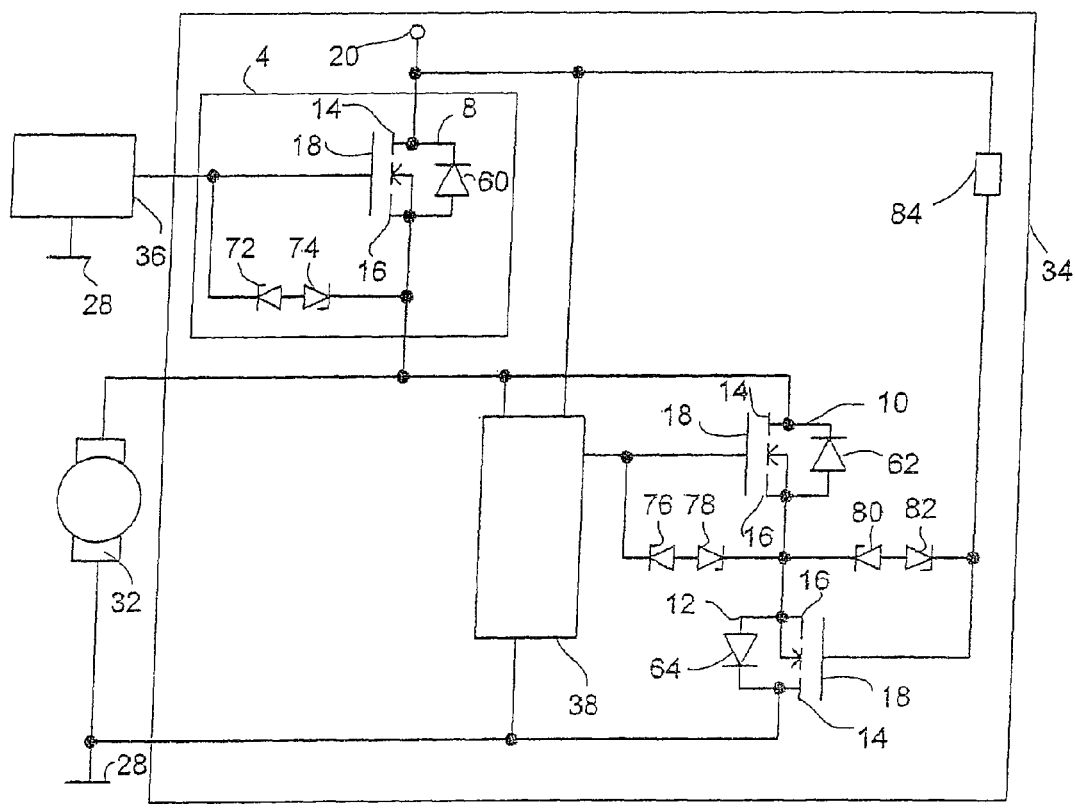
FIG. 2 shows an extended form of the known control circuit, which reproduces the prior art, consisting of a power driving assembly, a free-wheeling assembly and a reverse-connection protected assembly.
Figure 3:
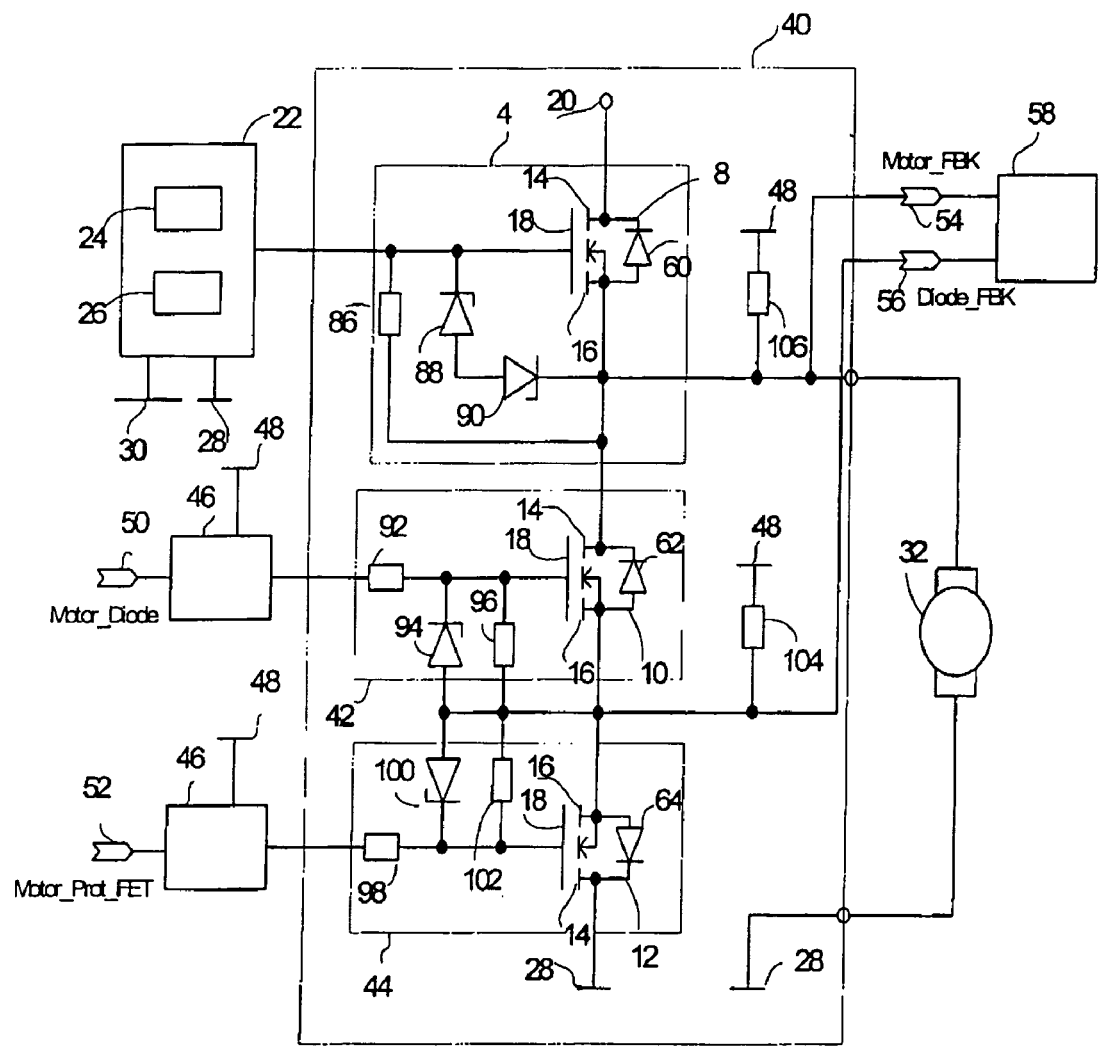
FIG. 3 shows the control circuit according to the invention which has failure control and has a power driving assembly, a free-wheeling assembly and a reverse-connection protected assembly.

FIG. 3 shows a control circuit 40, which has a power driving assembly 4, a free-wheeling assembly 42 and a reverse-connection protected assembly 44. The power driving assembly 4 is here equivalent to the power driving assembly 4 in FIG. 2. Inside the control circuit 40 the power driving assembly 4 is switched in series with a parallel circuit part. The direct current motor 32 forms the first branch of the parallel circuit part. The second branch of the parallel circuit part contains the series circuit of free-wheeling assembly 42 and reverse-connection protected assembly 44.

The assemblies contained in the control circuit 40, power driving assembly 4, reverse-connection protected assembly 44 and free-wheeling assembly 42, each have a MOSFET 8, 10, 12 with three terminals (drain 14, source 16, gate 18). In blocking operation each MOSFET has the behaviour of a diode switched parallel to the MOSFET (intrinsic diode), the cathode of which is led through at the drain terminal 14 and the anode of which is led through at the source terminal 16 of the respective MOSFET.

The drain terminal 14 of MOSFET 8 of the power driving assembly 4 is connected to the feed voltage source 20. The control circuit 40 is returned to earth 28 by the drain terminal 14 of MOSFET 12 of the reverse-connection protected assembly 44. The drain 14 and source 16 terminals of MOSFET 8 of the power driving assembly 4 and MOSFET 10 of the free-wheeling assembly 42 are switched in such a way that the intrinsic diodes 60, 62 of MOSFETS 8, 10 are loaded in the conductive direction by the feed voltage source 20. Drain 14 and source 16 of MOSFET 12 of the reverse-connection protected assembly 44, on the other hand, are switched in such a way that MOSFET 12 is in the blocking direction in respect of the feed voltage source. The source terminals 16 of the free-wheeling assembly 42 and the reverse-connection protected assembly 44 are therefore connected to one another. MOSFETS 10, 12 of the free-wheeling assembly 42 and the reverse-connection protected assembly 44 are in each case connected by gate terminal 18 via an ohmic resistor 92, 98 to separate level converters 46, 98, which are fed with a feed voltage 48. MOSFETS 10, 12 of the free-wheeling assembly 42 and the reverse-connection protected assembly 44 have in each case an ohmic resistor 96, 102 parallel to their gate source path. Likewise switched parallel to the gate source path of the two MOSFETs 10, 12 is in each case a breakdown diode 94, 100, the anodes of which are connected in each case to the source terminals 16 of MOSFETs 10, 12. Driving of the power driving assembly 4 is achieved by a control assembly 22. This contains a charge pump 24, which delivers the gate voltage for MOSFET 8, which is to be driven, and a microcontroller 26 to control MOSFET 8. Further switched parallel to the gate source path of MOSFET 8 of the power driving assembly 4 is an ohmic resistor 86. Likewise switched parallel to the gate source path of MOSFET 8 of the power driving assembly 4 is the series circuit consisting of two breakdown diodes 88, 90. Since the anodes of the breakdown diodes 88, 90 are switched together, their effect is comparable to that of an electric resistor or a bi-directionally operating limiting diode.

One aspect of the invention is to integrate failure control into the control circuit 40. A driving option for the free-wheeling assembly 42 and the reverse-connection protected assembly 44 is provided in each case for the failure control. The level converter 46 of the two assemblies is impinged for this purpose with a control signal generated by an external microprocessor. In FIG. 3 the inputs for the control signals are designated by Motor_Diode 50 and Motor_Prot_FET 52. The MOSFETs of the free-wheeling assembly 42 and the reverse-connection protected assembly 44 are to be transferred by the control signals into two different switching statuses in each case.

Voltage values are further to be read out at two outputs of the control circuit 40. A first output is for this purpose connected to the source terminal 16 of MOSFET 10 of the free-wheeling assembly 42. This output is supplied with a feed voltage 48 via an ohmic resistor 104. In FIG. 3 the first output bears the designation Diode_FBK 56. The second output is connected to the source terminal 16 of MOSFET 8 of the power driving assembly 4. This output is supplied with a feed voltage 48 via an ohmic resistor 106. In FIG. 3 the second output bears the designation Motor_FBK 54. Both outputs are connected to a diagnostic device 58.

The mode of operation of the control circuit 40 illustrated in FIG. 3 is described below. If there is no reversed polarity present, the feed voltage source 20 has a positive potential in respect of earth 28. In this case MOSFET 8 of the power driving assembly 4 acts as semi-conductor switch which, controlled by the microcontroller 26, connects the direct current motor 32 to the feed voltage source 20.

Figure 1:
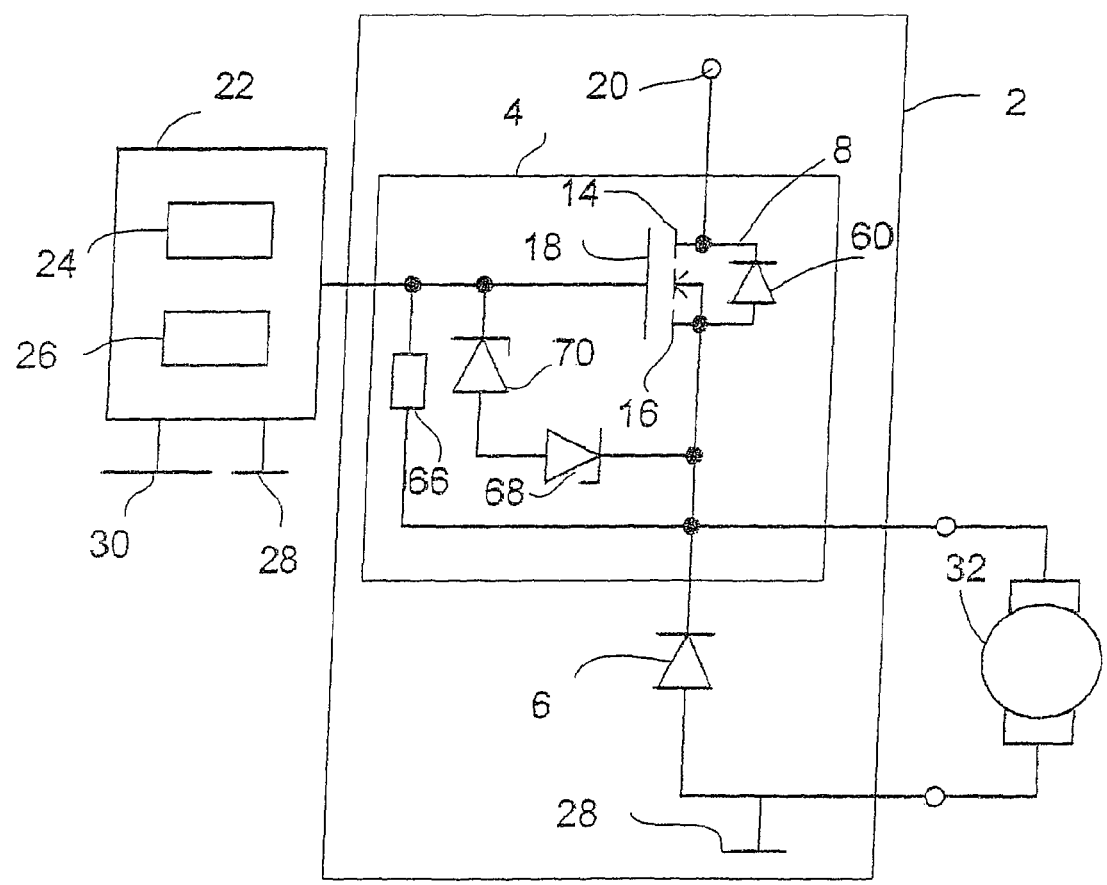
FIG. 1 shows a known control circuit consisting of a power driving assembly and a free-wheeling diode.

If the feed voltage source 20 has a positive potential (not reverse-connected) in respect of earth 28, the level converter 46 of the reverse-connection protected assembly 44 delivers a signal which serves to drive MOSFET 12 of the reverse-connection protected assembly 44. Owing to the effect of the intrinsic diode 64 of MOSFET 12 of the reverse-connection protected assembly 44, the source terminal 16 of MOSFET 12 initially has a potential of 0.7V. The voltage $U_{GS}$, resulting from the difference in potential between gate 18 and source 16 of MOSFET 12 of the reverse-connection protected assembly 44 causes MOSFET 12 of the reverse-connection protected assembly 44 to have conductive behaviour. The decreasing electric resistance $R_{DS}$ between drain 14 and source terminal 16 of MOSFET 12 allows the source potential to tend towards the value zero. At the same time the difference in potential $U_{GS}$ between source 14 and gate 16 of MOSFET 12 is further raised, whereby the electric resistance $R_{DS}$ between drain 14 and source 16 is further reduced. The source terminal 16 of MOSFET 10 of the free-wheeling assembly 42 is therefore approximately at the earth potential. If, in the meantime, no driving of the gate terminal 18 of MOSFET 10 of the free-wheeling assembly 42 takes place, the intrinsic diode 62 of MOSFET 10 acts like the free-wheeling diode 6 from FIG. 1.

If the feed voltage source 20 has been connected to the control circuit 40 with reversed polarity, the feed voltage source 20 has a negative potential in respect of earth 28. In this status of the control circuit 40 no driving of MOSFET 12 of the reverse-connection protected assembly 44 by an output signal of the level converter 46 takes place. As a result, the difference in potential between gate 18 and source 16 of MOSFET 12 of the reverse-connection protected assembly 44 has a value $U_{GS}$ close to zero. This in turn causes an electric resistance $R_{DS}$ between source 16 and drain 18 of MOSFET 12 of the reverse-connection protected assembly 44 which goes towards infinity. Since the intrinsic diode 64 of MOSFET 12 is also switched in the blocking direction, electrical disconnection of the feed voltage source 20 connected to the control circuit 40 with reversed polarity from the free-wheeling assembly 42 takes place. The intrinsic diode 60 of the power driving assembly 4, switched in the conductive direction, causes the feed voltage with reversed polarity to be charged exclusively with the direct current motor 32. The direct current motor 32 operates in this situation at maximum speed, wherein there is an opposite direction of rotation in respect of normal operation.

The failure control of the control circuit 40 includes bringing about different switching statuses of MOSFETs 8, 10, 12 and verification of voltage values to be read out.

For this purpose, in stand-by operation or when the direct current motor 32 is stationary, the MOSFETs of the free-wheeling assembly 42 and the reverse-connection protected assembly 44 are to be set by control signals. These control signals are to be fed in at the inputs Motor_Diode 50 and Motor_Prot_FET 52. In this way different operating statuses of the control circuit 40 are set. At the same time it is possible to read out voltage values at the outputs Motor_FBK 54 and Diode_FBK 56 of the control circuit 40. These voltage values are to be supplied to a diagnostic device 58. The diagnostic device 58 now recognises, using threshold value decisions, whether the operating status set by feeding in at the inputs Motor_Diode 50 and Motor_Prot_FET 52 has been reached. In the event of failure, using the voltage values read out at the outputs Motor_FBK 54 and Diode_FBK 56, the diagnostic device 58 determines which assembly has a defective, because unexpected, switching status. In this way it is possible to establish whether and which assembly has a defect or defective driving.

Various different operating statuses of the control circuit 40 can be set by individual driving of the MOSFETs of the free-wheeling assembly 42, the reverse-connection protected assembly 44 and the power driving assembly 4.

Different causes of failure are to be discovered for the operating statuses looked at below. If the control circuit has a failure-free operating status, this is likewise recognised.

Normal Operating Status

In normal operating status no driving takes place via the gate terminal 18 of MOSFET 10 of the free-wheeling assembly 42. The electric resistance $R_{DS}$ between drain 14 and source 16 of MOSFET 10 therefore has a value tending towards infinity. Since MOSFET 12 of the reverse-connection protected assembly 44 is supplied with a feed voltage via its gate terminal 18 in this operating status, the gate source voltage $U_{GS}$ causes the electric resistance $R_{DS}$ between drain 14 and source 16 of MOSFET 12 to adopt a minimum value. The voltage value to be read out at output Diode_FBK 56 in this case has the value zero owing to the lack of difference from the earth potential.

If, on the other hand, a value $V_{F\_62}$ is diagnosed, which corresponds to the value of the conducting state voltage of the intrinsic diode 62 of MOSFET 10 of the free-wheeling assembly 42, there is no defective function of the reverse-connection protected assembly 44. In this case there is a defective reverse-connection protected assembly 44 or defective driving of the reverse-connection protected assembly 44.

Reversed Polarity Operating Status

In the reversed polarity operating status the feed voltage source 20 has a negative potential in respect of earth 28. The gate terminal 18 of MOSFET 12 of the reverse-connection protected assembly 44 is not driven in this operating status. The lack of driving causes the electric resistance $R_{DS}$ between drain 14 and source 16 of MOSFET 12 to adopt a value towards infinity. The intrinsic diode 64 of MOSFET 12 is also switched into the blocking direction.

The voltage value to be read out at the output Diode_FBK 56 then results from the sum of the negative feed voltage $U_{BAT}$, the conducting state voltage $V_{F\_60}$ of the intrinsic diode 60 of the power driving assembly 4 and the conducting state voltage $V_{F\_62}$ of the intrinsic diode 62 of the free-wheeling assembly 42, as the following formula clarifies. This voltage value can be determined in the diagnostic device with the aid of threshold value decisions.

$$U_{Diode\_FBK} = -U_{BAT} + V_{F\_60} + V_{F\_62}$$

Test Case 1 Operating Status

In test case 1 operating status none of MOSFETs 8, 10, 12 are driven. The electric resistance $R_{DS}$ between drain 14 and source 16 of the MOSFETs has an infinite resistance. The voltage to be read out at output Diode_FBK 56 in this operating status adopts the value of the conducting state voltage of one of the two intrinsic diodes 64 of MOSFET 12 or 62 of MOSFET 10, for example the value $V_{F\_64}$.

However, if the diagnostic device 58 shows the value zero, this indicates that there is a short circuit of the free-wheeling assembly 42 or the reverse-connection protected assembly 44. In this case there is defective switching behaviour or defective driving of the assemblies.

If, on the other hand, the value $V_{F\_62}$ is diagnosed, this means that the intrinsic diode 64 of MOSFET 12 of the reverse-connection protected assembly 44 does not have conductive behaviour, indicating a defect in MOSFET 12 of the reverse-connection protected assembly 44.

The second voltage value to be read out at output Motor_FBK 54 has the value zero in failure-free switching behaviour. If, on the other hand, the voltage value $U_{BAT}$ is recognised, this indicates that there is an interruption of the electrical connection between the direct current motor 32 and the control circuit 40.

Test Case 2 Operating Status

In test case 2 operating status only MOSFET 10 of the free-wheeling assembly 42 is driven. The electric resistance $R_{DS}$ between drain 14 and source 16 of the MOSFETs of the power driving assembly 4 and the reverse-connection protected assembly 44 tends towards the value zero. In this operating status the voltage values to be read out at the outputs Motor_FBK 54 and Diode_FBK 56 have the value zero.

If, on the other hand, the diagnostic device 58 recognises the conducting state voltage $V_{F\_64}$ of the intrinsic diode 64 of the reverse-connection protected assembly 44 at the output Diode_FBK 56, this indicates that MOSFET 10 of the free-wheeling assembly 42 has blocking behaviour. The reason for this is a defect in MOSFET 10 of the free-wheeling assembly 42 or defective driving thereof.

If the voltage to be read out at output Motor_FBK 54 has the value of the conducting state voltage $V_{F\_64}$ of the intrinsic diode 64 of the reverse-connection protected assembly 44, an interruption of the electrical connection between direct current motor 32 and control circuit 40 is to be concluded.

Test Case 3 Operating Status

In test case 3 operating status only MOSFET 12 of the reverse-connection protected assembly 44 is driven via the gate terminal 18. The electric resistance $R_{DS}$ between drain 14 and source 16 of the MOSFETs of the power driving assembly 4 and the free-wheeling assembly 42 tends towards the value infinity. The voltage to be read out at the output Diode_FBK 56 has the value zero, since there is no difference in potential between earth 28 and the output Diode_FBK 56.

However, if the diagnostic device recognises the value of the conducting state voltage of $V_{F\_62}$ of the intrinsic diode 62 of MOSFET 10 of the free-wheeling assembly 42, this means that the driven MOSFET 12 of the reverse-connection protected assembly 44 and its intrinsic diode 64 have blocking behaviour. This in turn signifies a defect in the reverse-connection protected assembly 44 or defective driving thereof.

If the voltage to be read out at the output Motor_FBK 54 has the value $U_{BAT}$, an interruption of the electrical connection between direct current motor 32 and control circuit 30 is to be concluded.

For effective control of the functionality of the control circuit 40 the different operating statuses are to be set in succession. The driving of the assemblies required for this is to be performed with the aid of a microprocessor. Driving may also further be performed with the aid of a demultiplexer. This solution provides that the switching function of the demultiplexer assigns control signals to the inputs of the assemblies in succession. The sequential setting of different operating statuses with the aid of a demultiplxer can be achieved in that successive operating statuses can be transferred into one another only by alteration of a control signal to be read in.

In FIG. 4 voltage values to be read out at output Motor_FBK 54 and Diode FBK 56 of five different operating statuses are combined in a matrix. Illustrated are the voltage values for the normal operating status, reversed polarity operating status, test case 1 operating status, test case 2 operating status and test case 3 operating status. The switching status of MOSFET 8 of the power driving assembly 4, MOSFET 10 of the free-wheeling assembly 42 and MOSFET 12 of the reverse-connection protected assembly 44 is described for each of the five operating statuses by the designations On, Off and X (=either). If these switching statuses of MOSFETs 8, 10, 12 are achieved failure-free, the voltage values shown in grey in the matrix are to be read out at outputs Motor_FBK 54 and Diode_FBK 56 and to be recognised by the diagnostic device 58. If in an operating status a voltage value deviating from the voltage value shown in grey is recognised, there is defective switching behaviour of MOSFETS 8, 10, 12. The deviating voltage values are listed for each of the five operating statuses below and above the voltage value shown in grey. With the legend in FIG. 4, using the position of the deviating voltage values in the matrix, the cause of the deviation can be determined. A possible cause for this is a short circuit ($R_{DS} \rightarrow 0$) of the drain source path of MOSFET 10 of the free-wheeling assembly 42 or of MOSFET 12 of the reverse-connection protected assembly 44. A further cause is an infinitely large-resistance ($R_{DS} \rightarrow \infty$) of the drain source path of MOSFET 10 of the free-wheeling assembly 42 or of MOSFET 12 of the reverse-connection protected assembly 44. Disconnection of the direct current motor 32 from the control circuit 40 is a further cause. The causes mentioned are attributable to a defect or to defective driving of one of the assemblies.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Control circuit for an electric consumer with an inductive load portion, to be connected to a feed voltage source the control circuit comprising:
    a power driving assembly to connect the consumer electrically in controlled manner to the feed voltage source or to disconnect it therefrom;
    a free-wheeling assembly to avoid an electric voltage peak occurring when the consumer is electrically disconnected from the feed voltage source;
    a reverse-connection protected assembly, which avoids a short circuit current between the poles of the feed voltage source when the feed voltage source is connected to the control circuit with reversed polarity, with
    the power driving assembly being switched in series with a parallel switching part in which the electric consumer forms a first branch and a second branch contains a series circuit of the free-wheeling assembly and the reverse-connection protected assembly; and
    a diagnostic device connected to two outputs of the control circuit with the two outputs including a first output that is an output of the free-wheeling assembly and a second output that is an output of the power driving assembly, and with at least one of the assemblies being impinged with a control signal at a first input, in order to provide at least one of the control circuit outputs an output signal, which is to be supplied to the diagnostic device to determine failures in the control circuit, the diagnostic device being operative to perform a comparison between the output signal provided at the first output and a threshold value, to determine failures in the control circuit and by comparing the output signal and the threshold value, to establish whether and which assembly has a defect or defective driving, while the control circuit sets different operating statuses in succession in that control signals are assigned to the inputs of the assemblies in succession in order to provide at least one output of the assemblies an output signal, which is to be supplied to the diagnostic device.

2. Control circuit according to claim 1, to which an electric motor to be operated by direct current is to be connected as consumer.

3. Control circuit according to claim 1, wherein the power driving assembly has a controllable first semi-conductor switch by which the consumer is to be electrically connected to the feed voltage source or disconnected from it.

4. Control circuit according to claim 1, wherein the free-wheeling assembly has a free-wheeling diode, which reduces the electric voltage peak caused by the electrical disconnection of the feed voltage source from the consumer by self-induction.

5. Control circuit according to claim 3, wherein the free-wheeling assembly has a controllable second semi-conductor switch.

6. Control circuit according to claim 5, wherein the reverse-connection protected assembly has a controllable third semi-conductor switch.

7. Control circuit for an electric consumer with an inductive load portion, to be connected to a feed voltage source the control circuit comprising:
    a power driving assembly that includes a controllable first semi-conductor switch by which the consumer is to be electrically connected to the feed voltage source or disconnected from it;
    a free-wheeling assembly that includes a controllable second semi-conductor switch, the free wheeling assembly operable to avoid an electric voltage peak occurring when the consumer is electrically disconnected from the feed voltage source the free-wheeling assembly has;
    a reverse-connection protected assembly that includes a controllable third semi-conductor switch, the third semi-conductor switch of the reverse-connection protected assembly having an electric resistance by which a short circuit current between the poles of the feed voltage source is to be avoided if the feed voltage source is connected to the control circuit with reversed polarity,
    with the power driving assembly being switched in series with a parallel switching part in which the electric consumer forms a first branch and a second branch contains a series circuit of the free-wheeling assembly and the reverse-connection protected assembly; and
    a diagnostic device connected to two outputs of the control circuit with the two outputs including a first output that is an output of the free-wheeling assembly; and a second output that is an output of the power driving assembly, and with at least one of the assemblies being impinged with a control signal at a first input, in order to provide at least one of the control circuit outputs an output signal, which is to be supplied to the diagnostic device to determine failures in the control circuit, the diagnostic device being operative to perform a comparison between the output signal provided at the first output and a threshold value, to determine failures in the control circuit and by comparing the output signal and the threshold value, to establish whether and which assembly has a defect or defective driving, while the control circuit sets different operating statuses in succession in that control signals are assigned to the inputs of the assemblies in succession in order to provide at least one output of the assemblies an output signal, which is to be supplied to the diagnostic device.

8. Control circuit according to claim 1, wherein a semiconductor switch of at least one of the assemblies is to be driven by the control signal to be fed in at the first input of the respective assembly.

9. Control circuit according to claim 8, wherein the semiconductor switch of at least one assembly is to be transferred into at least two different switching statuses with the control signal to be fed in at the first input of the respective assembly.

10. Control circuit according to claim 9, wherein a first switching status of the respective semiconductor switch is to be set by switching the semiconductor switch into conductive operation by the control signal to be impinged at the first input of the respective assembly and a second switching status of the respective semiconductor switch is to be set by switching the semiconductor switch into blocking operation by the control signal to be impinged at the first input of the respective assembly.

11. Control circuit according to claim 8, wherein at least two different operating statuses of the control circuit are to be set by driving at least one semiconductor switch.

12. Control circuit according to claim 10, wherein in a first operating status of the control circuit a first semiconductor switch included in the free-wheeling assembly has the first switching status and a second semiconductor switch included in the reverse-connection protected assembly has the second switching status, in order to provide at least one first output an output signal, which is to be supplied to the diagnostic device, the diagnostic device being operative to diagnose the switching statuses of the first operating status and deviations therefrom by comparing the output signal with reference values.

13. Control circuit according to claim 12, wherein in a second operating status of the control circuit the second semiconductor switch included in the reverse-connection protected assembly has the first switching status, in order to provide at least one first output an output signal, which is to be supplied to the diagnostic device, the diagnostic device being operative to diagnose the switching statuses of the second operating status and deviations therefrom by comparing the output signal with reference values.

14. Control circuit according to claim 13, wherein a third semiconductor switch is included in the power driving assembly and further wherein in a third operating status of the control circuit the semiconductor switches included in all the assemblies have the first switching status, in order to provide at least one first output an output signal, which is to be supplied to the diagnostic device, the diagnostic device being operative to diagnose the switching statuses of the third operating state and deviations therefrom by comparing the output signal with reference values.

15. Control circuit according to claim 14, wherein in a fourth operating status of the control circuit the third semiconductor switch of the power driving assembly and the second semiconductor switch of the reverse-connection protected assembly have the first switching status and the first semiconductor switch of the free-wheeling assembly has the second switching status, in order to provide at least one first output an output signal, which is to be supplied to the diagnostic device, the diagnostic device being operative to diagnose the switching statuses of the fourth operating status and deviations therefrom by comparing the output signal with reference values.

16. Control circuit according to claim 15, wherein in a fifth operating status of the control circuit the third semiconductor switch of the power driving assembly and the first semiconductor switch of the free-wheeling assembly have the first switching status and the second semiconductor switch of the reverse-connection protected assembly has the second switching status, in order to provide at least one first output an output signal, which is to be supplied to the diagnostic device the diagnostic device being operative to diagnose the switching statuses of the fifth operating status and deviations therefrom by comparing the output signal with reference values.

17. Control circuit for an electric consumer with an inductive load portion, to be connected to a feed voltage source the control circuit comprising:
  a power driving assembly to connect the consumer electrically in controlled manner to the feed voltage source or to disconnect it therefrom;
  a free-wheeling assembly to avoid an electric voltage peak occurring when the consumer is electrically disconnected from the feed voltage source;
  a reverse-connection protected assembly, which avoids a short circuit current between the poles of the feed voltage source when the feed voltage source is connected to the control circuit with reversed polarity, with
  the power driving assembly being switched in series with a parallel switching part in which the electric consumer forms a first branch and a second branch contains a series circuit of the free-wheeling assembly and the reverse-connection protected assembly; and
  a diagnostic device connected to two outputs of the control circuit with the two outputs including a first output that is an output of the free-wheeling assembly; a second output that is an output of the power driving assembly, and with at least one of the assemblies being impinged with a control signal at a first input, in order to provide at least one of the control circuit outputs an output signal, which is to be supplied to the diagnostic device to determine failures in the control circuit, the diagnostic device being operative to perform a comparison between the output signal provided at the first output and a threshold value, to determine failures in the control circuit and by comparing the output signal and the threshold value, to establish whether and which assembly has a defect or defective driving, while the control circuit sets different operating statuses in succession in that control signals are assigned to the inputs of the assemblies in succession in order to provide at least one output of the assemblies an output signal, which is to be supplied to the diagnostic device; and the input of the assemblies is to be impinged with a control signal by a demultiplexer after a switching function.

\* \* \* \* \*